US011085529B2

(12) United States Patent
Vollmer et al.

(10) Patent No.: US 11,085,529 B2
(45) Date of Patent: Aug. 10, 2021

(54) AXLE DRIVE DEVICE FOR A MOTOR VEHICLE AS WELL AS METHOD FOR OPERATING AN AXLE DRIVE DEVICE

(71) Applicant: AUDI AG, Ingolstadt (DE)

(72) Inventors: Frank Vollmer, Ingolstadt (DE); Johannes Brunner, Neuburg an der Donau (DE); Markus Störmer, Berching (DE); Karl Jägle, Ingolstadt (DE); Thomas Hoffmann, Riedenburg (DE)

(73) Assignee: AUDI AG, Ingolstadt (DE)

( * ) Notice: Subject to any disclaimer, the term of this patent is extended or adjusted under 35 U.S.C. 154(b) by 455 days.

(21) Appl. No.: 15/942,954

(22) Filed: Apr. 2, 2018

(65) Prior Publication Data
US 2018/0335132 A1    Nov. 22, 2018

(30) Foreign Application Priority Data

May 22, 2017    (DE) ...................... 10 2017 208 633.5

(51) Int. Cl.
*F16H 61/02*    (2006.01)
*B60K 1/00*    (2006.01)
(Continued)

(52) U.S. Cl.
CPC ........... *F16H 61/0295* (2013.01); *B60K 1/00* (2013.01); *F16H 3/083* (2013.01); *F16H 3/089* (2013.01);
(Continued)

(58) Field of Classification Search
CPC .................. F16H 61/0295; F16H 37/0813
See application file for complete search history.

(56) References Cited

U.S. PATENT DOCUMENTS 1,427,961 A * 9/1922 Long ................... F16H 61/0293
74/336.5
5,573,074 A * 11/1996 Thames ................ B25B 21/008
173/178
(Continued)

FOREIGN PATENT DOCUMENTS

CN    2563098 Y    7/2003
CN    103307222 A    9/2013
(Continued)

OTHER PUBLICATIONS

German Examination Report, dated Mar. 14, 2018, in corresponding German Application No. 102017208633.5; pp. 12.
(Continued)

*Primary Examiner* — Terence Boes
(74) *Attorney, Agent, or Firm* — Maier & Maier, PLLC

(57) ABSTRACT

An axle drive device for a motor vehicle, having at least one drive assembly that is in operative connection with an input shaft of a shift transmission connecting the drive assembly to a wheel axle. The shift transmission a multiple-speed draw key transmission, having a draw key that, in different positions, establishes different transmission ratios between the input shaft and an output shaft of the shift transmission, wherein the draw key is connected to a centrifugal force regulator that shifts the draw key in dependence on a rotational speed of the input shaft or a rotational speed of the output shaft.

18 Claims, 1 Drawing Sheet

(51) Int. Cl.
*F16H 3/083* (2006.01)
*F16H 3/089* (2006.01)
*F16H 63/16* (2006.01)
*F16H 37/08* (2006.01)

(52) U.S. Cl.
CPC ........ *F16H 63/16* (2013.01); *B60K 2001/001* (2013.01); *F16H 37/0813* (2013.01)

(56) References Cited

U.S. PATENT DOCUMENTS

| | | | | |
|---|---|---|---|---|
| 5,989,149 | A * | 11/1999 | Apostolo | F16H 15/46 476/11 |
| 10,625,591 | B2 * | 4/2020 | Nishikawa | B60K 17/105 |
| 2016/0017968 | A1 * | 1/2016 | Kaltenbach | F16H 3/54 475/198 |
| 2016/0200193 | A1 * | 7/2016 | Liu | B60K 17/08 475/204 |
| 2017/0204940 | A1 * | 7/2017 | Tseng | B60K 17/06 |
| 2019/0120350 | A1 * | 4/2019 | Zhong | F16H 37/02 |
| 2019/0162299 | A1 * | 5/2019 | Eo | F16H 63/067 |
| 2019/0301576 | A1 * | 10/2019 | Harada | F16H 61/0213 |

FOREIGN PATENT DOCUMENTS

| | | | |
|---|---|---|---|
| DE | 353025 | C | 5/1922 |
| DE | 499 198 | C | 6/1930 |
| DE | 3041501 | A1 | 6/1982 |
| DE | 10 2013 108 416 | A1 | 2/2015 |
| FR | 2 946 291 | A1 | 12/2010 |
| GB | 463513 | A * | 4/1937 ......... F16H 61/0295 |
| WO | 2009/150046 | A1 | 12/2009 |

OTHER PUBLICATIONS

Office Action dated Mar. 28, 2019 in corresponding German Application No. 10 2017 208 633.5 including partial machine-generated English language translation; 10 pages.

European Search Report dated Oct. 15, 2018, in connection with corresponding EP Application No. 18163257.1 (13 pgs., including machine-generated English translation).

Office Action dated Nov. 3, 2020 in corresponding Chinese Application No. 201810449136.9; 10 pages including an English-language summary.

Chinese Office Action dated Mar. 26, 2021, in connection with corresponding CN Application No. 201810449136.9 (10 pp., including machine-generated English translation).

* cited by examiner

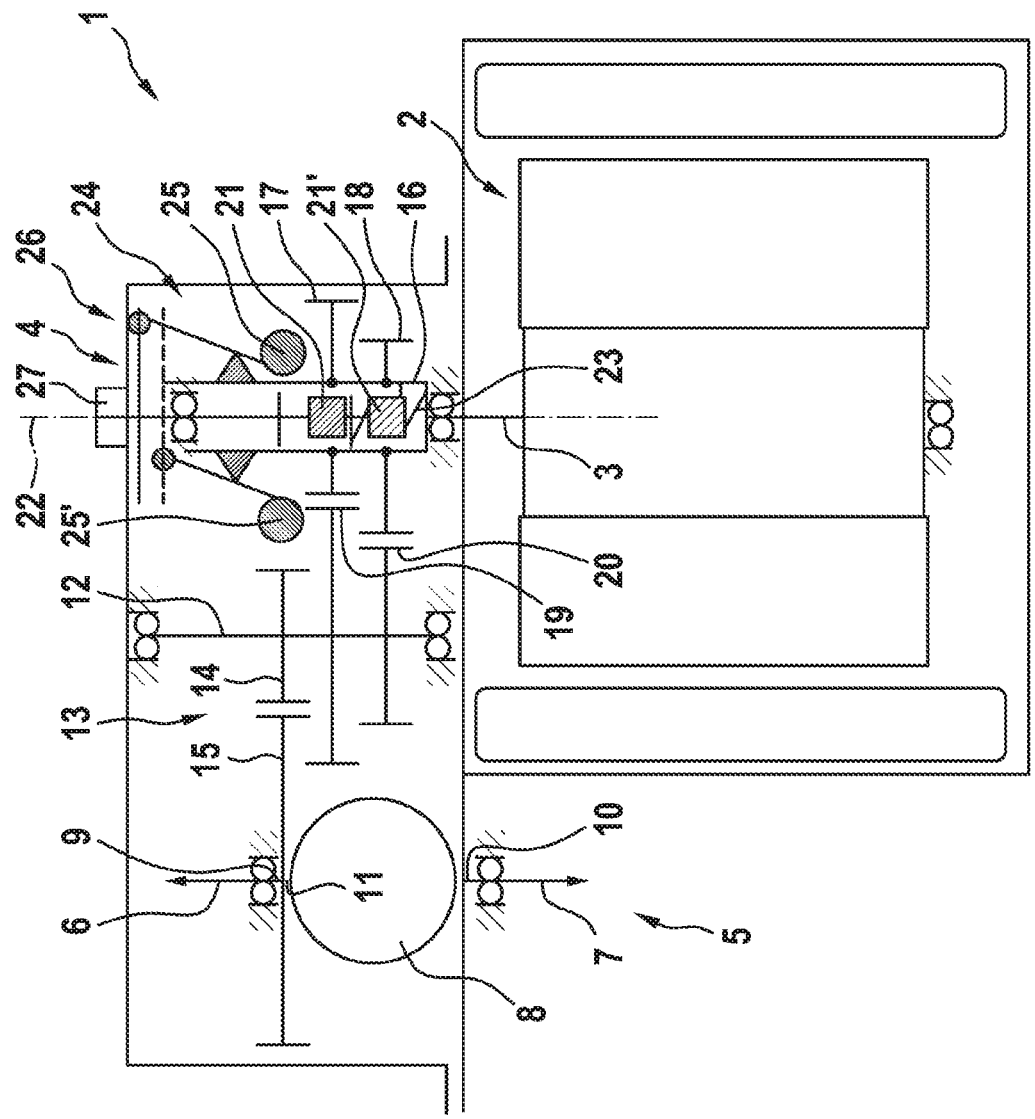

AXLE DRIVE DEVICE FOR A MOTOR VEHICLE AS WELL AS METHOD FOR OPERATING AN AXLE DRIVE DEVICE

FIELD

The invention relates to an axle drive device for a motor vehicle, having at least one drive assembly, which is in operative connection with an input shaft of a shift transmission operatively connecting the drive assembly to a wheel axle. The invention furthermore relates to a method for operating an axle drive device.

BACKGROUND

The axle drive device can be used as a component of the motor vehicle. The axle drive device serves to drive at least one wheel of a wheel axle of the motor vehicle, preferably several wheels of the wheel axle. With the aid of the axle drive device, accordingly, a torque directed at driving the motor vehicle can be provided or at least is able to be provided. The axle drive device comprises the drive assembly, which can basically have any desired form. Especially preferred, the drive assembly is present in the form of an electrical machine. The drive assembly comprises a drive shaft, for example, on which it provides a driving torque.

The drive assembly is operatively connected by way of the shift transmission to the wheel axle or at least an axle member of the wheel axle; in particular, it is permanent operatively connected, or at least can be operatively connected. The operative connection between the drive assembly and the wheel axle accordingly is present at least at times by way of the shift transmission. The shift transmission comprises the input shaft as well as an output shaft. The drive assembly is connected to the input shaft, especially in rigid and/or permanent manner. The output shaft of the shift transmission, on the other hand, is operatively connected to the wheel axle, preferably likewise in rigid and/or permanent manner. Now, the shift transmission is designed in such a way that a transmission ratio selected from one or a plurality of different transmission ratios can be established between its input shaft and its output shaft. The shift transmission accordingly may be designed as a gear shift transmission or a multiple-speed transmission.

From the prior art there is known, for example, the publication DE 10 2013 108 416 A1. This relates to an electric drive for a motor vehicle, comprising: an electric motor for driving a drive axle of the motor vehicle, a transmission unit which is drive-connected to the electric motor, and at least a first draw key device, which is arranged in a first power pathway between the electric motor and a driven part, and which can optionally make or break a torque transmission. However, the procedure for changing gears of the transmission unit which is described in the mentioned publication requires a complicated design of the electric motor.

SUMMARY

The object of the invention is to propose an axle drive device for a motor vehicle, which has advantages when compared with known axle drive devices, and which, in particular, enables a flexible use, despite simple and economical design, preferably over a broad speed range of the motor vehicle.

In this case, it is proposed that the shift transmission is designed as a multiple-speed draw key transmission, having a draw key which establishes different transmission ratios between the input shaft and an output shaft of the shift transmission in different positions, wherein the draw key is connected to a centrifugal force regulator, which shifts the draw key in dependence on a rotational speed of the input shaft or a rotational speed of the output shaft.

The shift transmission accordingly, as already explained, is designed such that it establishes one selected transmission ratio from a plurality of different transmission ratios between the input shaft and the output shaft, and therefore between the drive assembly and the wheel axle or the at least one wheel of the wheel axle. The shift transmission is designed as a draw key transmission, i.e., it has a draw key which can be shifted preferably in the axial direction with respect to an axis of rotation of the input shaft or the output shaft. Depending on the position of the draw key, a particular transmission ratio exists between the input shaft and the output shaft. Accordingly, different positions of the draw key are associated with different transmission ratios, so that when the draw key is placed in one of the positions, the particular ratio of the transmission ratios between the input shaft and the output shaft is established.

The draw key is connected or operatively connected to the centrifugal force regulator. The centrifugal force regulator serves to shift the draw key in dependence on the rotational speed, using as the rotational speed either the rotational speed of the input shaft or the rotational speed of the output shaft. Insofar as we speak in general of rotational speed in the context of this description, this shall always mean either the rotational speed of the input shaft or the rotational speed of the output shaft, unless otherwise indicated.

The centrifugal force regulator is designed, in particular, such that it exerts a force on the draw key, depending on the rotational speed, which is directed at a shifting of the draw key. With such a design of the axle drive device, the multiple-speed shift transmission or draw key transmission can be actuated in an especially simple manner. In particular, a purely passive actuating of the draw key transmission is provided, i.e., without an electric and/or hydraulic actuator. Instead, the actuating of the shift transmission or the establishing of the different transmission ratios between the input shaft and the output shaft is brought about solely by means of the centrifugal force regulator.

For this purpose, the centrifugal force regulator is coupled to the input shaft or the output shaft, especially in a rigid and/or permanent manner. This means that a centrifugal force element of the centrifugal force regulator is connected to the respective shaft with rotational locking, according to the rotational speed, i.e., the rotational speed of the input shaft or the rotational speed of the output shaft, depending on which the transmission ratio is to be established. At different rotational speeds of the respective shaft, the centrifugal force element is subjected to different centrifugal forces. The centrifugal force regulator is designed such that the centrifugal force on the centrifugal force element is transformed into a force acting on the draw key, especially an axial force. For this, a lever arrangement or the equivalent is provided in the operative connection, for example, between the centrifugal force element and the draw key.

Another embodiment of the invention provides that there are mounted on the input shaft a first drive gear wheel and a second drive gear wheel, wherein the draw key in a first of the positions couples the first drive gear wheel to the input shaft with rotational locking and disengages the second drive gear wheel from the input shaft, and in a second of the positions, it couples the second drive gear wheel to the input shaft with rotational locking and disengages the first drive gear wheel from the input shaft. In this way, an especially space-saving layout of the draw key transmission can be realized.

Preferably the shift transmission or draw key transmission is designed as a two-speed transmission, i.e., it enables only the establishing of one transmission ratio selected from precisely two transmission ratios. For this purpose, at least the first drive gear wheel and the second drive gear wheel, preferably only the first drive gear wheel and the second drive gear wheel, are mounted on the input shaft basically in rotational manner. Now, the draw key is designed such that it can secure each of the drive gear wheels with respect to the input shaft, but then the other drive gear wheel is always released or disengaged from the input shaft. This means that the draw key always connects either the first drive gear wheel or the second drive gear wheel to the input shaft with rotational locking and releases the other respective drive gear wheel.

Another embodiment of the invention provides that the first drive gear wheel meshes with a first driven gear wheel and the second drive gear wheel meshes with a second driven gear wheel, wherein the first driven gear wheel and the second driven gear wheel are permanently coupled to the output shaft. By means of the first drive gear wheel and the first driven gear wheel, a first transmission ratio is realized, and by means of the second drive gear wheel and the second driven gear wheel, a second transmission ratio is realized, wherein the two transmission ratios are different from one another. The first drive gear wheel meshes permanently with the first driven gear wheel and the second drive gear wheel meshes permanently with the second driven gear wheel. The two driven gear wheels, i.e., the first driven gear wheel and the second driven gear wheel, are permanently coupled to the output shaft, i.e., connected to it with rotational locking. Thus, different transmission ratios can be realized in a simple manner.

An enhancement of the invention provides that the draw key transmission is designed so that the draw key establishes a lower transmission ratio for higher rotational speed. Accordingly, the centrifugal force regulator of the draw key transmission pushes the draw key at a lower first rotational speed into a first position, and at a higher second rotational speed, into a second position, wherein, in the second position of the draw key a lower transmission ratio is established than in the first position. Accordingly, a higher torque can be provided on the wheel axle by means of the axle drive device at lower rotational speeds than in the second position, whereas in the second position a higher rotational speed of the wheel axle or the output shaft of the shift transmission can be realized than in the first position.

Another preferred embodiment of the invention provides that the draw key is spring-loaded by means of a spring element, wherein the spring force pushes the draw key into one of the positions in which it establishes a particular transmission ratio. The draw key is operatively connected to the spring element, for example, the spring element engages, on the one hand, with the draw key, and, on the other hand, is braced against an element of the draw key transmission, for example, against an inner end face of the input shaft of the shift transmission. In this case, the input shaft is designed as a hollow shaft, the draw key being situated in the hollow shaft.

The spring force brought about by means of the spring element pushes the draw key in the direction of one of the positions, in particular into this position. In the position, the draw key establishes a particular transmission ratio, i.e., it secures a particular gear wheel of the drive gear wheels with respect to the input shaft. The spring force of the spring element counteracts the force produced by the centrifugal force regulator on the draw key, i.e., in this respect, it produces a counterforce directed opposite this force. In this way, a definite transmission ratio is always advantageously established.

Another embodiment of the invention provides that the particular transmission ratio is a largest transmission ratio. For example, the spring element pushes the draw key in the direction of an end stop. If the draw key is lying against the end stop, it will establish the largest transmission ratio of the shift transmission between the input shaft and the output shaft. By the largest transmission ratio is meant the greatest possible transmission ratio of the shift transmission. This always makes it possible to provide a sufficient torque on the wheel axle by means of the drive assembly.

In the context of another embodiment of the invention, it may be provided that the draw key transmission can only be shifted without load. This means that a shifting of the draw key by means of the centrifugal force regulator is only possible when the draw key transmission is present in a load-free state, i.e., only a little or no torque below a certain limit torque is being transmitted between the input shaft and the output shaft. In particular, the draw key transmission is designed such that the shifting of the draw key occurs first, or only occurs, when the torque transmitted between the input shaft and the output shaft is less than the given limit torque.

For example, it is provided that, when a torque is present, especially a torque in excess of the limit torque, then the drive gear wheel which is currently coupled to the input shaft with rotational locking will secure the draw key by force locking in the axial direction, namely, by virtue of the torque transmitted. Accordingly, the drive gear wheel clamps the draw key to the input shaft, as long as a torque is being transmitted that is greater than the limit torque or at least corresponds to this limit torque. No additional means are necessary for securing the draw key in such an embodiment.

A preferred enhancement of the invention provides that the output shaft is coupled directly or indirectly by way of at least one gear stage to a differential input shaft of an axle differential transmission. The axle differential transmission is a component of the axle drive device. The axle differential transmission comprises the differential input shaft as well as several differential output shafts. The differential output shafts are operatively connected to the wheel axles, whereas the differential input shaft is connected to the output shaft of the draw key transmission, preferably in rigid and/or permanent manner.

The coupling of the differential input shaft to the output shaft may be produced either directly or only indirectly. In the direct coupling, the output shaft is directly connected to the differential input shaft, namely, in particular, such that they always have the same rotational speed. In the case of the indirect coupling, the at least one gear stage which produces a rotational speed transmission ratio is present between the output shaft and the differential input shaft. If the gear stage is present, then the output shaft and differential input shaft always have a certain rotational speed ratio to each other, at least as long as their rotational speeds are greater than zero.

Finally, in the context of another embodiment of the invention, it may be provided that differential output shafts of the shift transmission are coupled to axle members of the wheel axles. This has already been mentioned above. The wheel axle comprises the axle members, especially two axle members. The axle members are coupled by way of the axle differential transmission both to each other and also to the differential input shaft, especially in permanent manner. On each of the axle members is preferably mounted at least one wheel of the motor vehicle, or it is at least operatively connected to the respective axle members, namely, preferably in rigid and/or permanent manner.

The invention furthermore relates to a method for operating an axle drive device for a motor vehicle, especially an axle drive device according to the above statements, wherein the axle drive device comprises at least one drive assembly, which is in operative connection with an input shaft of a shift transmission operatively connecting the drive assembly to a wheel axle. It is proposed in this case that the shift transmission is designed as a multiple-speed draw key transmission, having a draw key that establishes different transmission ratios between the input shaft and an output shaft of the shift transmission in different positions, wherein the draw key is connected to a centrifugal force regulator, which shifts the draw key in dependence on a rotational speed of the input shaft or a rotational speed of the output shaft.

The benefits of such a design of the axle drive device or of such a procedure have already been pointed out. Both the axle drive device and the method for its operation may be further developed in accordance with the above statements, so that reference is made to them in this regard.

For example, it is provided that a switching between the transmission ratios is realized by a corresponding actuating of the drive assembly, especially if the draw key transmission can only be shifted load-free. In this case, under a force produced by the centrifugal force regulator on the draw key, which would result in a changing of the transmission ratio in the load-free state of the shift transmission, the drive assembly is actuated so that the shift transmission is load-free. Accordingly, the draw key can be moved and a different transmission ratio established. After this, the drive assembly is once again actuated so that a torque is transmitted by way of the shift transmission, especially a torque which secures the draw key in the axial direction.

In other words, it is provided at first to operate the drive assembly in such a way that the draw key is secured in the axial direction by virtue of the torque transmitted by way of the shift transmission. Accordingly, the transmission ratio also will not change at a rotational speed of the input shaft or the output shaft which would already bring about a changing of the transmission ratio in the load-free state of the shift transmission. Such a changing of the transmission ratio is ultimately brought about only by the load-free shifting of the shift transmission by the corresponding actuation of the drive assembly. After the changing of the transmission ratio by the corresponding actuating of the drive assembly, the latter is again actuated such that the draw key is secured in the axial direction.

BRIEF DESCRIPTION OF THE DRAWING

The invention will now be explained more closely by means of the exemplary embodiments represented in the drawing, without this limiting the invention. In this case, the single FIGURE shows:

FIG. 1 shows a schematic representation of an axle drive device for a motor vehicle.

DETAILED DESCRIPTION OF THE DRAWING

The FIGURE shows a schematic representation of an axle drive device 1 for a motor vehicle. The drive device 1 has a drive assembly 2, which in the exemplary embodiment represented here is designed as an electrical machine. The drive assembly 2 has a drive shaft 3, on which a driving torque can be provided. In addition to the drive assembly 2, the axle drive device 1 has a shift transmission 4, by which the drive assembly 2 can be connected or is at least connectible to a wheel axle 5.

The wheel axle 5 comprises two axle members 6 and 7, the axle members 6 and 7 being coupled via an axle differential transmission 8 to the shift transmission 4. The axle members 6 and 7 are accordingly connected or coupled to differential output shafts 9 and 10 of the axle differential transmission 8, especially in a rigid and/or permanent manner. A differential input shaft 11 of the axle differential transmission 8, on the contrary, is coupled to an output shaft 12 of the shift transmission 4, either directly or—as in the exemplary embodiment depicted—indirectly by way of a gear stage 13, having a first gear wheel 14 coupled to the output shaft 12 and a second gear wheel 15 coupled to the differential input shaft 11. An input shaft 16 of the shift transmission 4, on the other hand, is coupled to the drive shaft 3 of the drive assembly 2, preferably in rigid and/or permanent manner.

On the input shaft 16 of the shift transmission 4 are mounted a first drive gear wheel 17 as well as a second drive gear wheel 18, especially in rotational manner. The first drive gear wheel 17 meshes permanently with a first driven gear wheel 19 and the second drive gear wheel 18 meshes permanently with a second driven gear wheel 20. The two driven gear wheels 19 and 20 are coupled to the output shaft 12, in particular being arranged on it and preferably operatively connected to it in rigid and/or permanent manner.

The shift transmission 4 is designed as a draw key transmission and accordingly has a draw key 21 or 21', which can be arranged in two different positions, the different reference numbers designating the draw key 21 or 21' in different positions. In the first position, the draw key 21 couples the first drive gear wheel 17 in rotational locking to the input shaft 16, whereas it disengages the second drive gear wheel 18 from the input shaft 16. In its second position, on the other hand, the draw key 21' couples the second drive gear wheel 18 in rotational locking to the input shaft 16 and disengages the first drive gear wheel 17 from it. Accordingly, in the two different positions of the draw key 21 and 21', different transmission ratios of the shift transmission 4 or draw key transmission are established between the input shaft 16 and output shaft 12.

The draw key 21 or 21' can be moved in the axial direction relative to an axis of rotation 22 of the input shaft 16. It is preferably spring-loaded by means of a spring element 23, which pushes it in the direction of one of the positions of the draw key 21 or 21'. For example, it is provided that the force produced by the spring element 23 pushes the draw key 21 or 21'—as indicated here—in the direction of the first position. Preferably, however, it is provided that the spring element 23 or the spring force produced by it pushes the draw key 21 or 21' in the direction of one of the positions in which the largest transmission ratio is present, i.e., the second position in the exemplary embodiment shown.

The draw key 21 or 21' is connected to a centrifugal force regulator 24, which moves the draw key 21 or 21' in the axial direction in dependence on a rotational speed of the input shaft 16. The centrifugal force regulator 24 has at least one centrifugal force element 25 or 25', which is indicated here in two different positions, the different positions being identified by the different reference numbers. In one position, which is present at a lower rotational speed, the centrifugal force element is designated with the reference number 25 and in a second position, which is present at higher rotational speed, it is designated by the reference number 25'.

It will be clear that the centrifugal force element 25 or 25' is mounted on the input shaft 16 and is movable in the radial direction. It is operatively connected by a lever arrangement 26 to the draw key 21, the lever arrangement 26 being designed such that it transforms a radial displacement of the centrifugal force element 25 or 25' into an axial displacement of the draw key 21 or 21'. With the aid of the centrifugal force regulator 24, a purely passive actuation of the shift transmission 4 is realized. Accordingly, no electrical and/or hydraulic actuator is provided for the activation of the shift transmission 4. In this way, an axle drive device 1 can be realized which offers the advantage of a multiple-speed shift transmission 4, yet which is extremely economical to implement.

Further, an optional holding device 27 may be present, by means of which the draw key 21 can be secured in one of its positions. For example, the holding device 27 is present in the form of an electric holding device and accordingly it comprises an electrical actuator for securing and releasing the draw key 21. With the aid of the holding device 27, a defined shifting time can be specified or a shifting can be accomplished at a defined time.

The invention claimed is:

1. An axle drive device for a motor vehicle, comprising:
at least one drive assembly, which is in operative connection with an input shaft of a shift transmission connecting the drive assembly to a wheel axle, wherein the shift transmission is designed as a multiple-speed draw key transmission, having a draw key that, in different positions, establishes different transmission ratios between the input shaft and an output shaft of the shift transmission wherein the draw key is connected to a centrifugal force regulator that shifts the draw key in dependence on a rotational speed of the input shaft or a rotational speed of the output shaft;
wherein there are mounted on the input shaft a first drive gear wheel and a second drive gear wheel, wherein the first drive gear wheel meshes with a first driven gear wheel and the second drive gear wheel meshes with a second driven gear wheel, wherein the first driven gear wheel and the second driven gear wheel are permanently coupled to the output shaft.

2. The axle drive device according to claim 1, wherein the draw key in a first of the positions couples the first drive gear wheel to the input shaft with rotational locking and disengages the second drive gear wheel from the input shaft, and in a second of the positions it couples the second drive gear wheel to the input shaft with rotational locking and disengages the first drive gear wheel from the input shaft.

3. The axle drive device according to claim 1, wherein the draw key transmission is designed so that the draw key establishes a lower transmission ratio in the case of higher rotational speed.

4. The axle drive device according to claim 1, wherein the draw key is spring-loaded by means of a spring element, wherein the spring force pushes the draw key into one of the positions in which it establishes a particular transmission ratio.

5. The axle drive device according to claim 4, wherein the particular transmission ratio is a largest transmission ratio.

6. The axle drive device according to claim 1, wherein the draw key transmission is only shiftable without load.

7. The axle drive device according to claim 1, wherein the output shaft is coupled directly or indirectly by way of at least one gear stage to a differential input shaft of an axle differential transmission.

8. The axle drive device according to claim 1, wherein differential output shafts of the axle differential transmission are coupled to axle members of the wheel axle.

9. The axle drive device according to claim 1, wherein the input shaft is designed as a hollow shaft, and the draw key is situated in the hollow shaft.

10. An axle drive device for a motor vehicle, comprising:
at least one drive assembly, which is in operative connection with an input shaft of a shift transmission connecting the drive assembly to a wheel axle, wherein the shift transmission is designed as a multiple-speed draw key transmission, having a draw key that, in different positions, establishes different transmission ratios between the input shaft and an output shaft of the shift transmission wherein the draw key is connected to a centrifugal force regulator that shifts the draw key in dependence on a rotational speed of the input shaft or a rotational speed of the output shaft;
wherein the draw key is spring-loaded by means of a spring element, wherein the spring force pushes the draw key into one of the positions in which it establishes a particular transmission ratio, and wherein the spring element is braced against an inner end face of the input shaft of the shift transmission.

11. The axle drive device according to claim 10, wherein there are mounted on the input shaft a first drive gear wheel and a second drive gear wheel, wherein the draw key in a first of the positions couples the first drive gear wheel to the input shaft with rotational locking and disengages the second drive gear wheel from the input shaft, and in a second of the positions it couples the second drive gear wheel to the input shaft with rotational locking and disengages the first drive gear wheel from the input shaft.

12. The axle drive device according to claim 11, wherein the first drive gear wheel meshes with a first driven gear wheel and the second drive gear wheel meshes with a second driven gear wheel, wherein the first driven gear wheel and the second driven gear wheel are permanently coupled to the output shaft.

13. The axle drive device according to claim 10, wherein the draw key transmission is designed so that the draw key establishes a lower transmission ratio in the case of higher rotational speed.

14. The axle drive device according to claim 10, wherein the particular transmission ratio is a largest transmission ratio.

15. The axle drive device according to claim 10, wherein the draw key transmission is only shiftable without load.

16. The axle drive device according to claim 10, wherein the output shaft is coupled directly or indirectly by way of at least one gear stage to a differential input shaft of an axle differential transmission.

17. The axle drive device according to claim 10, wherein differential output shafts of the axle differential transmission are coupled to axle members of the wheel axle.

18. The axle drive device according to claim 10, wherein the input shaft is designed as a hollow shaft, and the draw key is situated in the hollow shaft.

* * * * *